United States Patent [19]

Fritz et al.

[11] 4,033,101
[45] July 5, 1977

[54] CONTINUOUS LOAD STACK-FORMING METHOD AND MACHINE

[75] Inventors: David Paul Fritz, Newton; John Dale Anderson, Canton; Martin Eugene Pruitt; Deroy Ernest Mahagan, both of Hesston; Richard James Buller, Newton, all of Kans.

[73] Assignee: Hesston Corporation, Hesston, Kans.

[22] Filed: Aug. 13, 1975

[21] Appl. No.: 604,310

[52] U.S. Cl. .................................. 56/344; 56/350; 302/28

[51] Int. Cl.² ........................................ A01D 87/10

[58] Field of Search ........................... 56/344–360; 214/518–522; 302/7, 8, 28, 37, 38

[56] References Cited

UNITED STATES PATENTS

| 3,733,798 | 5/1973 | Garrison | 56/350 |
| 3,744,228 | 7/1973 | Lundahl | 56/344 |
| 3,886,719 | 6/1975 | Garrison et al. | 56/344 |

Primary Examiner—J.N. Eskovitz
Attorney, Agent, or Firm—Schmidt, Johnson, Hovey & Williams

[57] ABSTRACT

In the interval between successive press cycles, crop material is picked up from the field and loaded into the stack-forming body of the machine. However, upon initiation of a press cycle, crop material, which continues to be picked up as the machine is advanced, is diverted into an accumulating chamber and collected within the latter until termination of the press cycle. Thereupon, the accumulation is discharged for recycling through the pickup and loading mechanism to be delivered into the forming body along with previously uncycled material. Alternative embodiments involve discharging the accumulation onto the ground ahead of the loader for pickup by the latter a second time, and discharging the accumulation either directly into the front or rear of the loader at a point above the ground.

17 Claims, 11 Drawing Figures

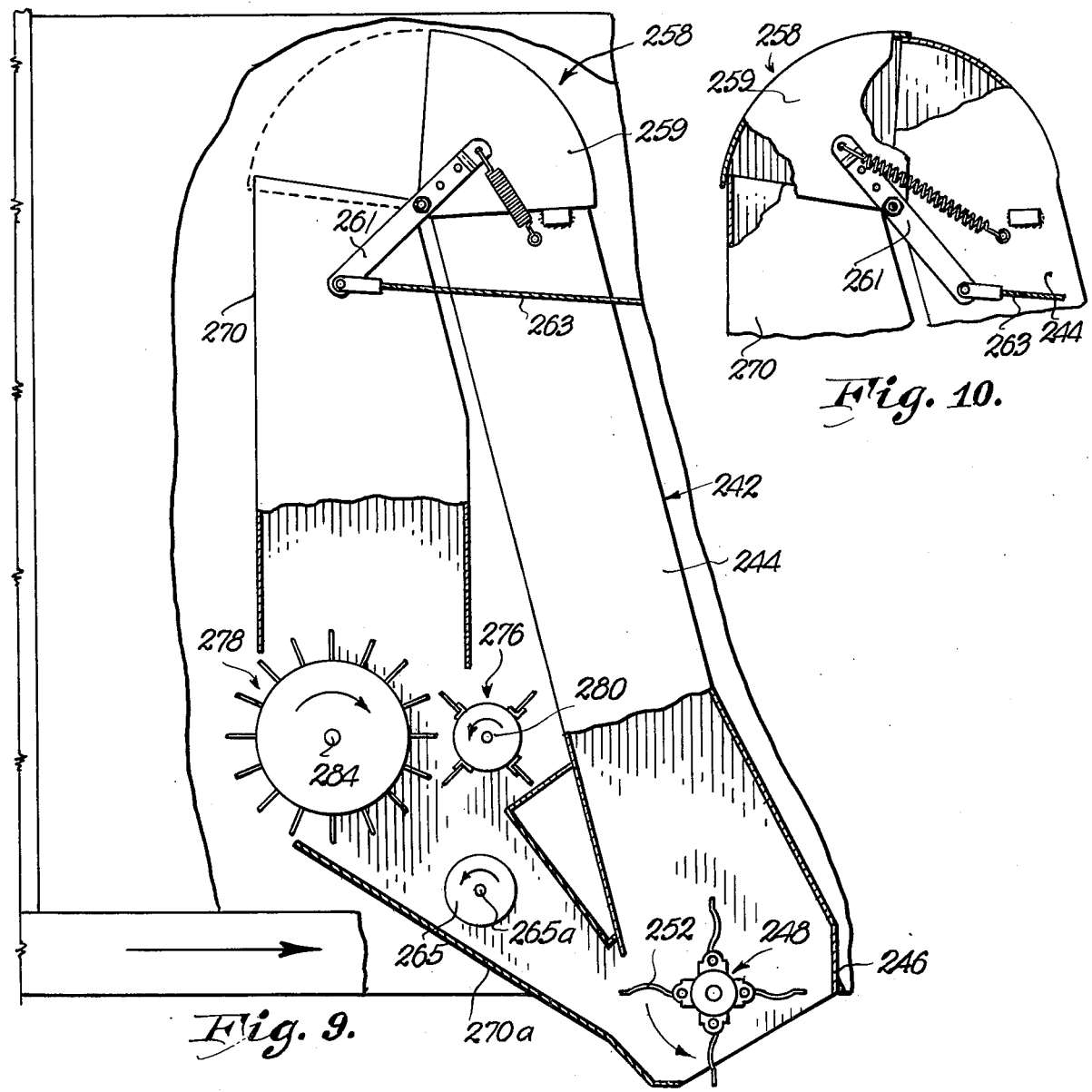
Fig. 9.
Fig. 10.
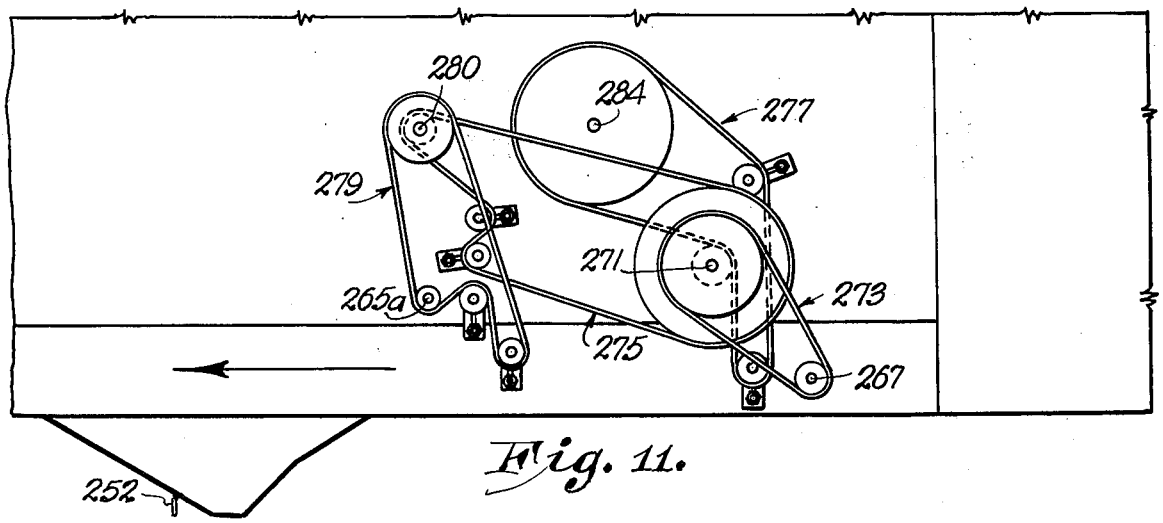
Fig. 11.

CONTINUOUS LOAD STACK-FORMING METHOD AND MACHINE

This invention relates to forming large compacted stacks of crop materials and, more particularly, to method and apparatus enabling one man to continuously advance a stack-forming machine across a field on a nonstop basis to pick up crop material on the field even while collected material is being compacted in the machine.

The concept of continuously loading a stack-forming machine during the pressing or compacting cycle so as to permit the machine to be advanced continuously across the field has been previously disclosed and claimed in U.S. Pat. No. 3,733,798, in the name of Garrison, issued May 22, 1973, and U.S. Pat. No. 3,886,719, in the name of Garrison, issued June 3, 1975, both of which are owned by the assignee of the present invention. The present invention provides certain improvements over such earlier developments.

One important object of the present invention is to provide relatively simplified though highly efficient method and apparatus for permitting continuous loading of a stack-forming machine as the latter is advanced nonstop across a field.

Another important object of the invention is to provide continuous loading method and apparatus which avoid any tendency to adversely affect proper distribution and even spreading of the crop material within the hollow stack-forming body thereof to the end that the finished stack will be of the highest quality in terms of size, shape and density.

An additional important object of the present invention is to take advantage of existing crop-loading mechanism on the machine for conveying to the forming body material which has been diverted to an accumulation chamber outside of the body during the press cycle.

In accordance with the foregoing object, it is an important aim of this invention to recirculate through the crop-loading mechanism and thence into the forming body material that has once been picked up and diverted to an accumulation chamber during the press cycle.

Other important objects of the invention include providing alternative arrangements for discharging the accumulated material directly back onto the field ahead of the crop-loading mechanism or delivering the accumulation directly into the loading mechanism above the ground; providing means for making diversion and accumulation of the picked up crop stream responsive to initiation of the press cycle; and providing means for forcibly feeding and metering material out of its accumulating chamber at a predetermined uniform rate of discharge.

In the drawings:

FIG. 9 is an enlarged, fragmentary, schematic view, partly in elevation and partly in cross-section of a third embodiment of the invention and taken from the right side of the machine;

FIG. 10 is a fragmentary, elevational view of the upper ends of the loading spout and accumulating chamber illustrating the manner in which they are placed in communication with one another; and FIG. 11 is a fragmentary elevational view of drive mechanism for the components of the machine illustrated in FIG. 8 but taken from the side opposite that illustrated in FIG. 9.

Figure 1:
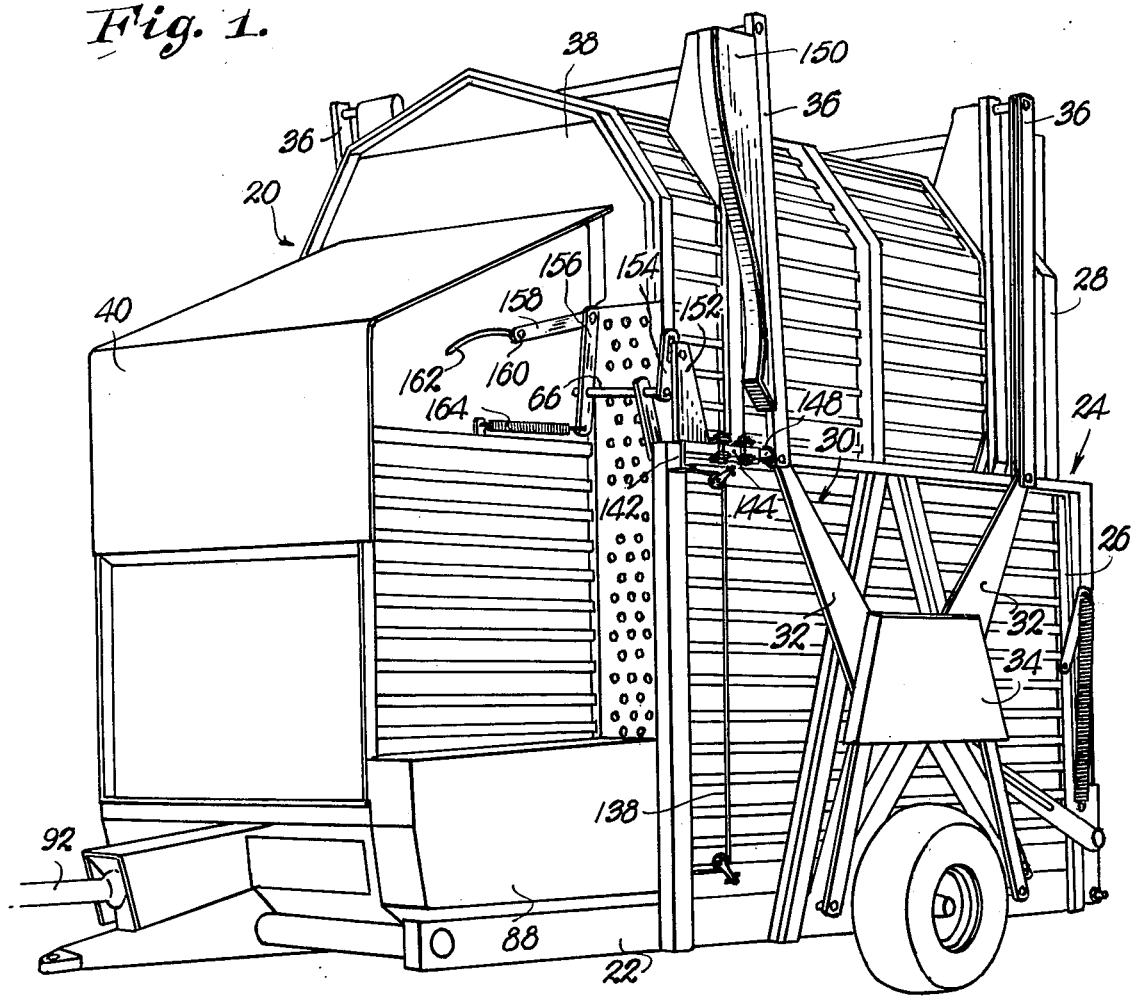
FIG. 1 is a front perspective view of a stack-forming machine constructed in accordance with the teachings of the present invention and capable of carrying out the novel method herein described.

The stack-forming machine 20 has a wheeled chassis 22 carrying a hollow crop-receiving body 24 provided with a closed bottom, open top lower section 26 and a closed top, open bottom upper section 28 telescopically received within lower section 26. Upper section 28 functions in the nature of a press for periodically compacting crop received within the body 24 and is reciprocated vertically in its telescoping action by suitable actuating apparatus denoted broadly by the numeral 30, there being one apparatus 30 for each side of the body 24. By way of example, each apparatus 30 includes a pair of beams 32 pivoted to the lower section 26 for swinging movement about horizontal axes and intermeshed through appropriate gear teeth (not shown) below protective shroud 34 so that the beams 32 swing simultaneously in opposite directions about their respective axes. Long upright links 36 connect the upper ends of beams 32 with press section 28 for driving the latter.

The rear ends of sections 26 and 28 are normally closed by suitable gates (not shown) although such gates are open during unloading of the stack after the formation cycle has been completed. On the other hand, while the front of lower section 26 is closed, upper section 28 has a wide opening 38 at its front end which permits the entry of crop material into the hollow body 24 during operation.

A relatively large, generally rectangular box 40 ahead of lower section 26 houses a crop loader 42 (FIG. 3) that includes a long, upright spout 44, a smaller box-like housing 46 communicating with the lower end of spout 44, and a pickup rotor 48 disposed within housing 46 and mounted for rotation about a horizontal axis 50. Rotor 48 has a number of flail paddles 52 that sweep upwardly and forwardly as rotor 48 is rotated clockwise viewing FIG. 3, and paddles 52 thus operate to pick up crop material through the open bottom 54 of housing 46 and project the same in a strong airstream upwardly through spout 44 for discharge through its rearwardly curved tip 56 into the opening 38 for collection in body 24.

Figure 6:
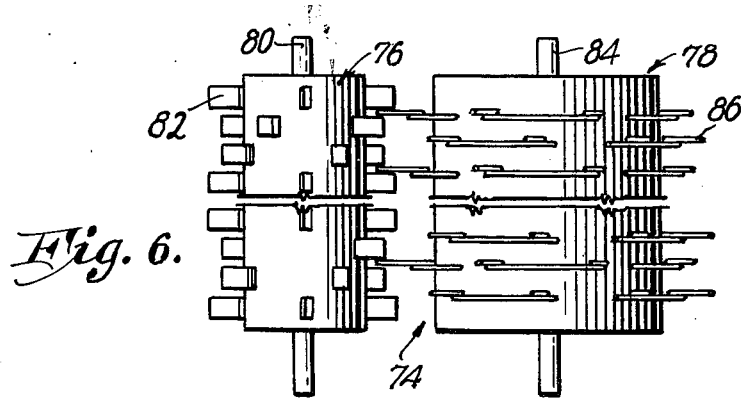
FIG. 6 is an enlarged, schematic top plan view illustrating the relationship between the feeding and metering rolls associated with the accumulating chamber.
Figure 7:
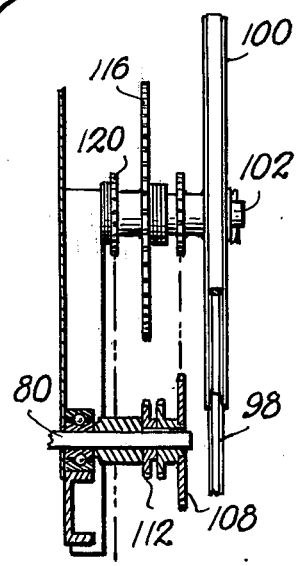
FIG. 7 is a fragmentary, cross-sectional view of the drive for the rolls of FIG. 6 taken along line 7—7 of FIG. 2.
Figure 3:
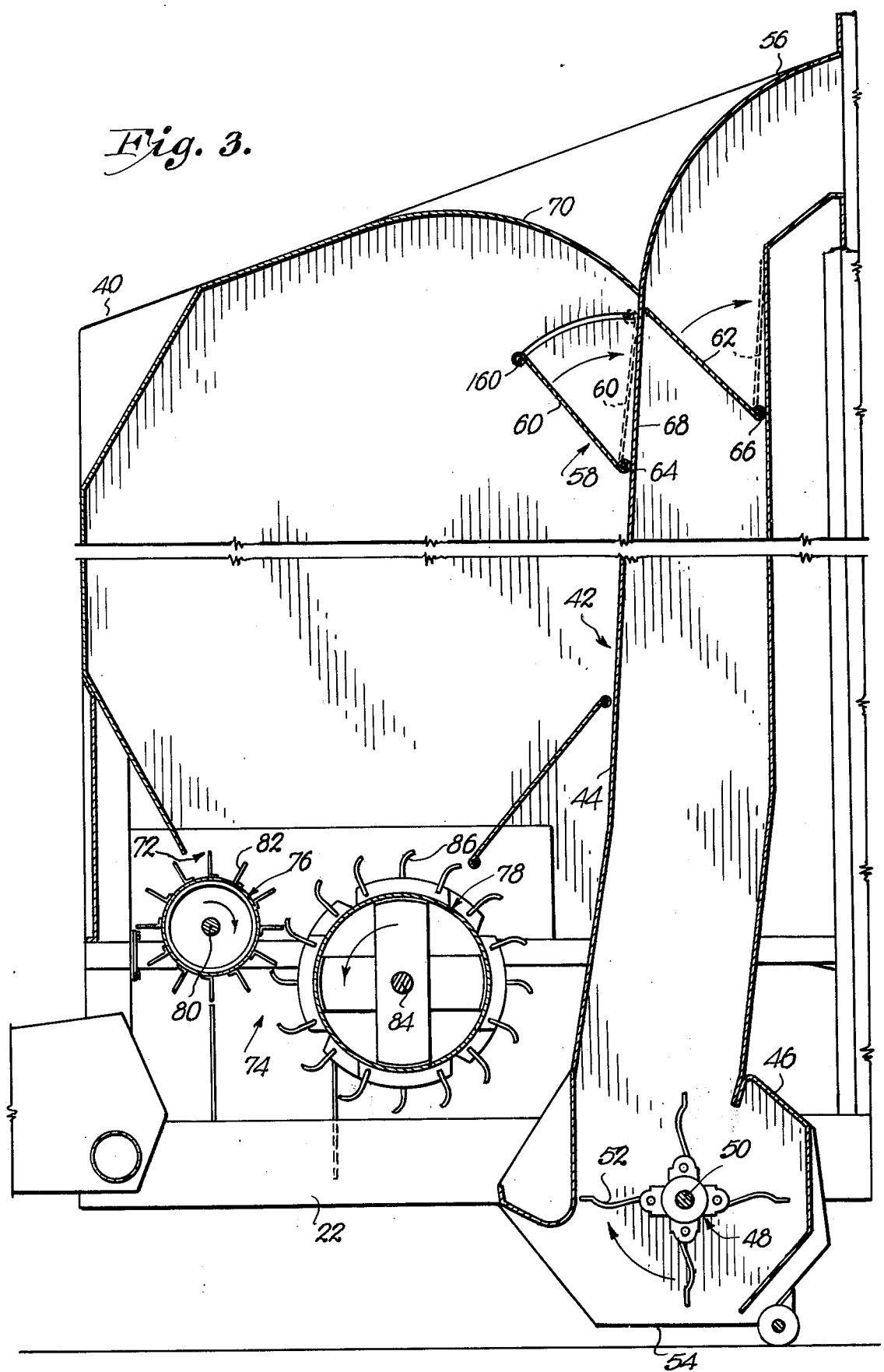
FIG. 3 is an enlarged, fragmentary vertical cross-sectional view through the front end of the machine illustrating details of construction.

A crop diverter 58 within spout 44 includes a pair of parallel panels 60 and 62 that are carried by lower pivot shafts 64 and 66 for swinging movement in unison between the inclined positions illustrated in solid lines in FIG. 3 and generally upright positions illustrated in broken lines in the same Figure. A forwardly disposed aperture 68 in spout 44 above pivot 64 communicates spout 44 with an accumulating chamber 70 housed within box 50 ahead of loader 42. The enclosed chamber 70 has access thereto only through the upper aperture 68 and through its open bottom 72 that is controlled by crop retaining structure 74 in the nature of a pair of oppositely rotatable, cooperating rolls 76 and 78. A stripper roll 76 is the smaller of the two, is mounted on a horizontally extending shaft 80 in front of roll 78, and has a number of radially extending, flat paddles 82 (FIG. 6). On the other hand, feeding roll 78 is substantially twice as large as roll 76, is mounted on a horizontally extending shaft 84, and has a number of radially extending hooked fingers 80 spaced about its periphery and disposed to pass between the paddles 82 of front roll 76.

Figure 2:
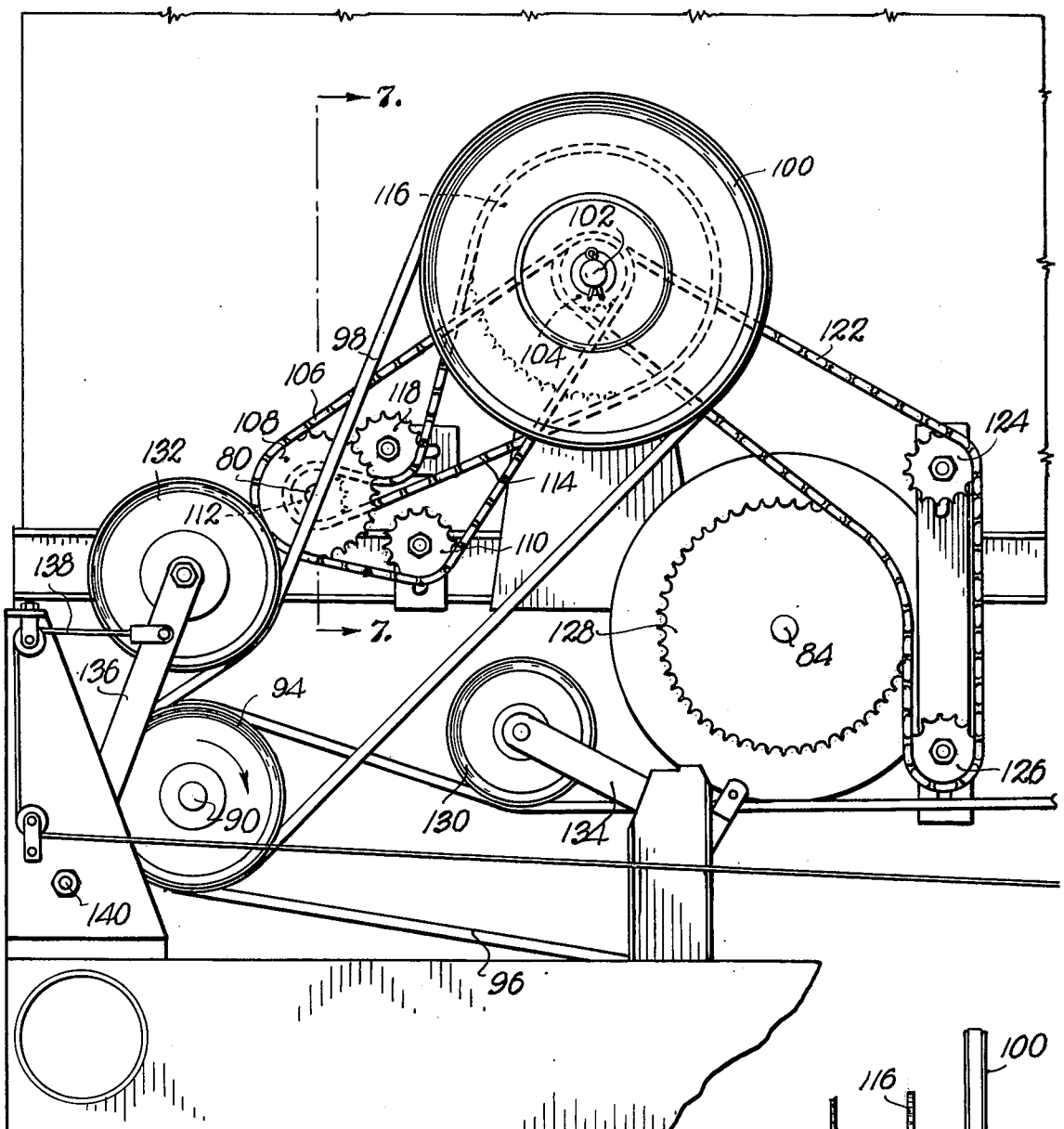
FIG. 2 is an enlarged, fragmentary elevational view of drive apparatus for various components of the machine.

FIG. 2 illustrates the drive mechanism for rolls 76 and 78, such mechanism being normally hidden from view by the small housing 88 illustrated in FIG. 1 adjacent box 40 and in front of lower section 26. An input shaft 90 is coupled through a right angle gearbox (not shown) with the power takeoff shaft 92 (FIG. 1) of a towing vehicle for the machine 20, and the input shaft 90 carries a double pulley 94. One track of the pulley 94 entrains a long endless belt 96 that extends rearwardly for driving conveyor mechanism (not shown) within body 24 for unloading a stack from the latter, while the second track of pulley 94 is entrained by an upwardly and rearwardly angled endless belt 98 that is looped around an upper pulley 100. Pulley 100 is rotatably carried by a stationary shaft 102 and has a small sprocket 104 rigidly affixed to its inner face for rotation therewith. Sprocket 104 is entrained by a drive chain 106 which in turn wraps around sprocket 108 affixed to the shaft 80 of front roll 76. Drive chain 106 also is partly entrained around an adjustable idler sprocket 110.

A second small sprocket 112 is fixed to the sprocket 108 for rotation therewith, and a chain 114 wraps about sprocket 112 and another sprocket 116 carried by stationary shaft 102 adjacent the pulley 100 and its sprocket 104. An idler sprocket 118 maintains the proper tension on chain 114. A still further sprocket 120, the same size as sprocket 104, is fixed to sprocket 116 for rotation therewith, and another drive chain 122 wraps around sprocket 120 and extends downwardly and rearwardly therefrom about a pair of adjustable idler sprockets 124 and 126. The driving stretch of chain 122 partly entrains a large sprocket 128 fixed to shaft 84 of roll 78 for driving the latter.

Power supplied through the input shaft 90 causes the double pulley 94 to constantly rotate in a clockwise direction viewing FIG. 2, but belt 96 will only be driven if the tensioner 130 has been manually actuated to tighten belt 90 about the inner track of pulley 94. Similarly, the belt 98 will only be driven if its tensioner 132 engages the slack side of belt 98 with sufficient force to tighten the same about the outer track of pulley 94. While tensioners 130 and 132 are shown in their belt-engaging positions (spring-biased to such positions by means not shown), it is of course to be understood that they can be swung by their respective mounting arms 134 and 136 out of such engagement as desired. In any event, when belt 98 is engaged by tensioner 132, the net result is to rotate shaft 80 and its roll 76 in a clockwise direction, viewing FIGS. 2 and 3, while the shaft 84 and its roll 78 are rotated in a counterclockwise direction viewing the same Figures.

Figure 4:
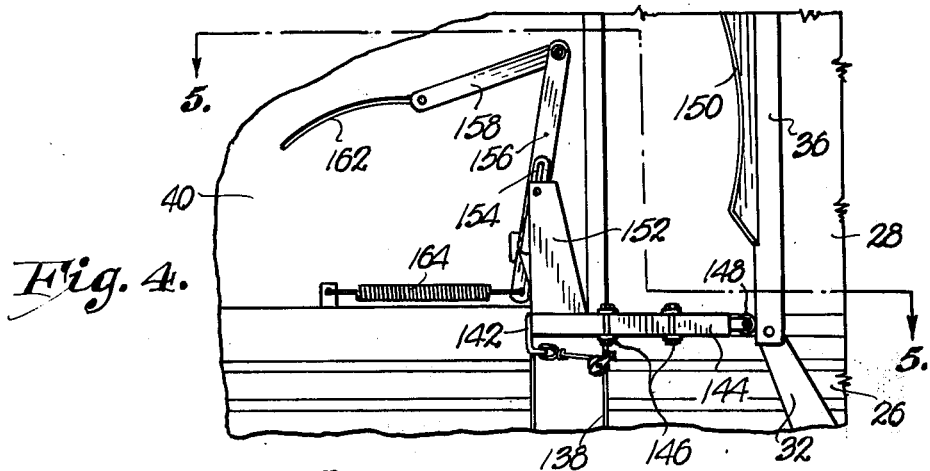
FIG. 4 is an enlarged, fragmentary detail view of the left front corner of the machine illustrating mechanism for rendering diversion and accumulation of picked up crop material responsive to actuation of the press.
Figure 5:
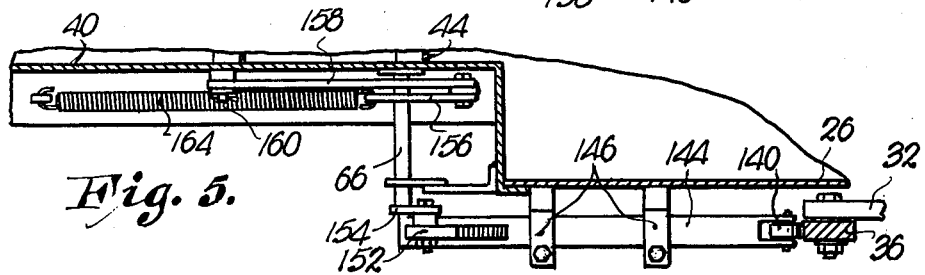
FIG. 5 is a fragmentary, cross-sectional view of that mechanism taken substantially along line 5—5 of FIG. 4.

Tensioners 130 and 132 may be manually actuated if desired, but in the arrangement illustrated, at least tensioner 132 is made responsive to actuation of the press section 28. In this regard, a cable 138 is coupled with the arm 136 of tensioner 132 above the pivot 140 for arm 136, and cable 138 leads generally rearwardly and thence upwardly when lower section 26 is reached to be ultimately anchored to an L-shaped bracket 142 (FIGS. 1, 4 and 5) mounted on the forwardmost end of a fore-and-aft extending slide bar 144. Bar 144 is mounted on lower section 26 by guides 146 for fore-and-aft sliding movement and has, at its rearmost end, a cam follower 148 engageable with a generally upright cam 150 mounted on the front side of a front link 36. Follower 148 is normally maintained below cam 150 in engagement with link 36 itself as illustrated in FIG. 1, in which position tensioner 132 is biased into tensioning engagement with its belt 98. After a downstroke of approximately six inches, however, follower 148 becomes engaged with cam 150 such that bar 144 is shifted forwardly a sufficient distance to disengage tensioner 132 from belt 98. The arcuate configuration of cam 150 compensates for the forward swinging of link 36 by its beam 32 during downstroke of the press section 28 so that once follower 148 is engaged with cam 150, bar 144 remains in substantially the same displaced position.

Operation of the diverter 58 may also be made responsive to press actuation. To this end, an upstanding, generally triangular plate 152 on the forwardmost end of bar 144 is drivingly coupled with a crank 154 for rocking the extended pivot shaft 66 of diverter panel 62. A generally upright link 156 is mounted between its ends on the shaft 66 for rotation therewith, and the upper end of link 156 is connected through a second link 158 to a pin 160 carried by diverter panel 60. An arcuate slot 162 clears pin 160 during its fore-and-aft movement with panel 60, and panels 60 and 62 are thereby interconnected for swinging movement in unison. A tension spring 164 interconnects the lower end of link 156 and box 40 to yieldably bias diverter 58 into its dotted line position indicated in FIG. 3.

OPERATION

As the machine 20 is towed by a vehicle across the field, the loader 42 remains in continuous operation to pick up crop lying on the field through open bottom 54. Rotor 48 sweeps the crop forwardly and upwardly into the spout 44 whereupon the projected crop will flow into the body 24 or the accumulating chamber 70, depending upon the position of diverter 58. While body 24 is filling, the pressure section 28 will normally be fully raised such that cam 150 is disengaged from follower 148, allowing bar 144 to remain in its rearmost disposition. This enables the spring 164 to maintain diverter 58 in its upright, broken-line position illustrated in FIG. 3 such that crop material is fed directly into the body 24 through opening 38 instead of diverting into the accumulating chamber 70.

When a sufficient quantity of crop material has collected within body 24, the actuating apparatus 30 is operated to begin the press cycle, but the machine 20 is not stopped and pickup rotor 48 continues in operation. As press section 28 is lowered, the cam 150 engaging follower 148 causes diverter 58 to shift to its inclined position shown in FIG. 3, so that material moving upwardly in spout 44 is diverted forwardly into accumulating chamber 70 instead of entering body 24. The diverted material gravitates onto the rolls 76 and 78 and progressively builds up within chamber 70. Rolls 76 and 78 are stationary during this time because engagement of the cam 150 with follower 148 also causes disengagement of the tensioner 132 with drive belt 98, hence deactivating rolls 76 and 78. Thus, they function to effectively retain the diverted material within accumulating chamber 70 rather than to feed the same from the latter.

After press section 28 has compacted the material within body 24, it is raised to its fullest extent as illustrated in FIG. 1, whereupon follower 148 becomes disengaged from cam 150 such that diverter 58 returns to its normal upright position and rolls 76 and 78 become activated. Hence, material picked up by rotor 48 again becomes projected directly into the body 24 rather than being diverted into chamber 70. Moreover, the accumulation within chamber 70 is fed out of the latter at a predetermined rate of discharge between the rolls 76 and 78 to drop directly onto the field ahead of loader 42 to combine with material already there for subsequent pickup by rotor 48. Hence, the accumulation within chamber 70 becomes recirculated back into loader 42, whereupon it is projected along with new material into the body 24 for collection and subsequent compaction.

OTHER EMBODIMENTS

Figure 8:
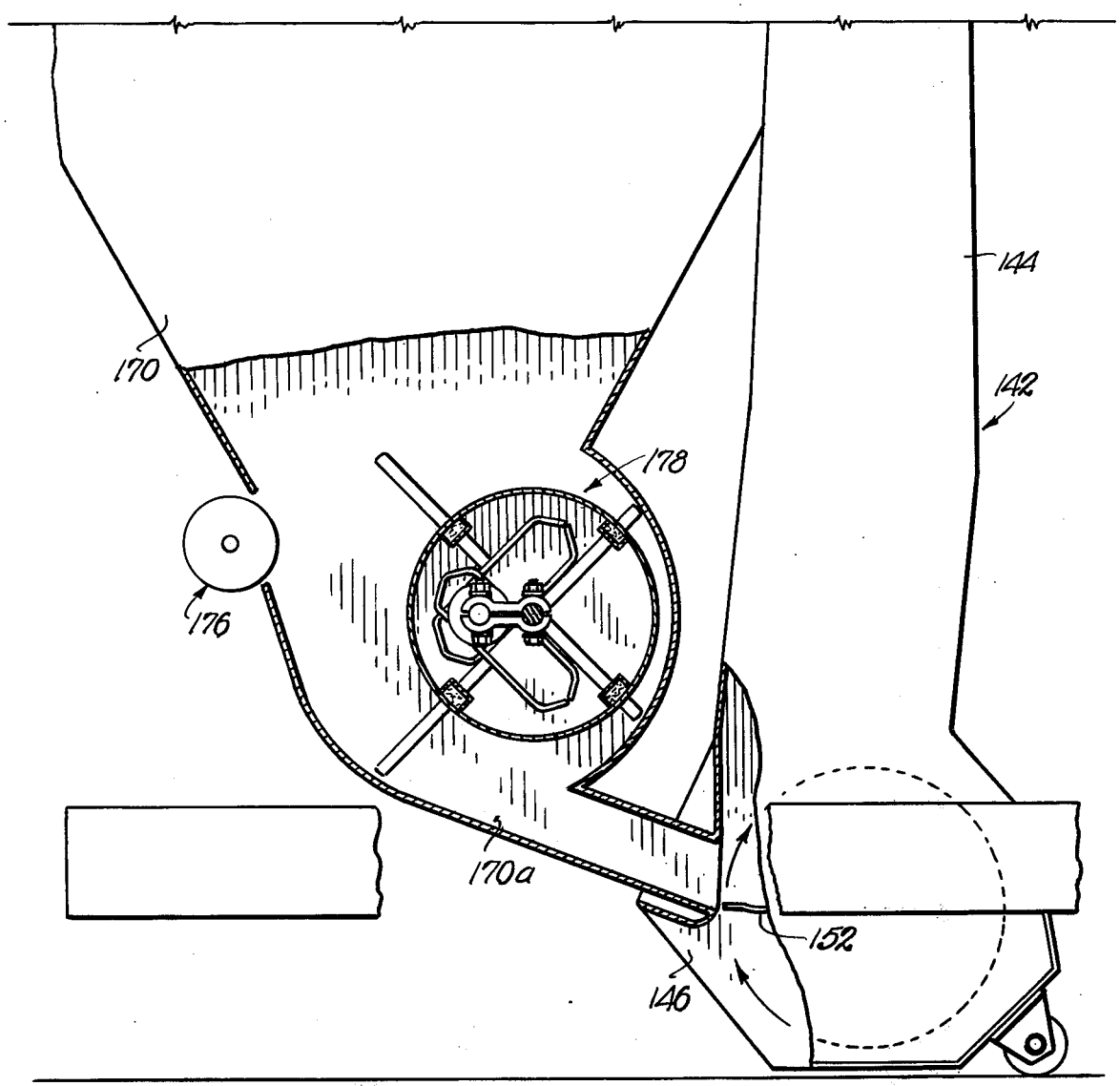
FIG. 8 is an enlarged, schematic view partly in elevation and partly in cross section illustrating a second embodiment of the invention.

FIG. 8 shows an arrangement wherein the accumulating chamber 170 discharges material accumulating during the press cycle directly into loader 142 rather than dumping the accumulation onto the field ahead of the pickup point. When the roll 178 is activated to rotate in a counterclockwise direction in the same manner as roll 78 (roll 176 is freewheeling), accumulated material is metered out of chamber 170 and fed through conduit 170a directly into the front of rotor housing 146. Hence, the material is presented to the upwardly sweeping flail paddles 152 to be immediately projected upwardly through spout 144.

If desired, roll 178 may take the form of a retracting finger drum of the type found, for example, in U.S. Pat. No. 2,748,921, in the name of White, and issued June 5, 1956, while the front roll 176 may have a smooth exterior as illustrated. In all other respects the embodiment of FIG. 8 may be identical to that illustrated in FIGS. 1-8 and may be operated through substantially the same sequence of events.

FIGS. 9-11 illustrated a third embodiment of the invention wherein the accumulating chamber 270 is disposed behind rather than in front of the loader 242 as in the previous embodiment. Rolls 276 and 278 function in the same manner as before to retain the accumulation in chamber 270 during the press cycle and to forcibly discharge the same therefrom at the conclusion of such cycle, but instead of feeding the accumulation directly onto the ground or into the front of loader 22, such material is directed through conduit 270a into the rear of loader 242 just behind rotor 248. Thus, the accumulation is presented to paddles 252 as the latter move downwardly and forwardly for engagement with new crop material lying on the field. The accumulation is therefore mingled with such new material within rotor housing 246 and immediately projected upwardly through spout 244.

Whether crop material being projected through spout 244 enters the collecting body 24 or is diverted into chamber 270 depends upon the position of diverter 258 in the same manner as in the first two embodiments. Contrary to those two arrangements, however, diverter 258 in the present embodiment may take the form of a swingable bonnet 259 which directs material into the collecting body 24 when bonnet 259 is in the position illustrated in FIG. 9, but which diverts such material into chamber 270 when it is in the position illustrated in FIG. 10. Bonnet 259 may be actuated automatically, along with rolls 276 and 278, in response to initiation of the press cycle as in the first two embodiments, or it may be controlled manually through a spring-loaded lever 261 and cable 263.

Depending upon the length of conduit 270a it may be necessary to provide an intermediate feed roll 265 to assure that material being discharged from chamber 270 by rolls 276 and 278 is properly fed into the rotor housing 246.

An arrangement for driving the intermediate roll 265, as well as rolls 276 and 278, is illustrated in FIG. 11 which views the machine from the side opposite that illustrated in FIG. 9. Input power is supplied through a shaft 267 which drives a jackshaft 271 through a chain and sprocket assembly 273. Jackshaft 271 in turn drives the shaft 280 of roll 276 through a second chain and sprocket assembly 275, and also drives the shaft 284 of roll 278 through a third chain and sprocket assembly 277. Shaft 280 is then utilized to drive the shaft 265a of intermediate roll 265 through a fourth chain and sprocket assembly 279.

Regardless of which of the above described three embodiments is utilized, their material recirculation approach to the continuous loading concept provides nonstop advancement of the machine 20 as the stack is being formed without detracting from proper distribution of the crop material within body 24. The result is a well-shaped, uniformly dense stack of high weather-shedding quality that can be readily unloaded and transported from location to location without breaking apart.

Having thus described the invention, what is claimed as new and desired to be secured by Letters Patent is:

1. A continuous loading stack-forming machine including:
   a mobile, hollow body for receiving crop material to be formed into a stack,
   said body including a press for periodically compacting material received within the body;
   a loader adjacent said body for continuously lifting material from a field as the body is advanced and for delivering the material into the body;
   an accumulating chamber ajacent said loader;
   a diverter selectively operable to direct picked up material into the chamber instead of the body;
   structure selectively operable to retain the diverted material in the accumulator or discharge the same for recirculation through said loader; and
   mechanism controlling operation of said diverter and said structure for accumulating material in said chamber during actuation of the press and loading the accumulation along with new material into the body during the interval between successive actuations of the press.

2. A continuous loading stack-forming machine as set forth in claim 1, wherein said structure is disposed to discharge material onto the field ahead of said loader.

3. A continuous loading stack-forming machine as set forth in claim 1, wherein said chamber is provided with means communicating the same with said loader downstream from said structure for discharging material from the chamber directly into the loader.

4. A continuous loading stack-forming machine as set forth in claim 3, wherein said loader includes an upright tubular spout and a driven rotor operable to blow material upwardly through said spout, said means communicating the chamber with the loader below said spout and adjacent said rotor.

5. A continuous loading stack-forming machine as set forth in claim 4, wherein said means communicates the chamber with the loader behind the rotor.

6. A continuous loading stack-forming machine as set forth in claim 4, wherein said means communicates the chamber with the loader in front of the rotor.

7. A stack-forming machine as claimed in claim 1, wherein said structure includes means for forcibly feeding material from the chamber at a predetermined rate of discharge.

8. A stack-forming machine as claimed in claim 7, wherein said feeding means includes a pair of oppositely rotatable, cooperating feed rolls.

9. A stack-forming machine as claimed in claim 8, wherein said structure further includes a selectively engageable drive to said rolls for retaining the material when the drive is disengaged and for discharging the material when the drive is engaged.

10. A stack-forming machine as claimed in claim 1, wherein said mechanism includes means for rendering said diverter and said structure responsive to actuation of the press.

11. A stack-forming machine as claimed in claim 10, wherein said means includes a cam movable with the press, a cam follower mounted for displacement by said cam, and means linking said diverter and said structure respectively with said follower.

12. A stack-forming machine as claimed in claim 1, wherein said loader includes a tubular spout and means for blowing the material in a stream through the spout, said diverter being coupled with said spout for controlling the direction of movement of said stream.

13. A stack-forming method which includes the steps of:
picking up crop material from a field while advancing across the same and delivering the material along a predetermined path of travel toward a point of collection;
periodically compacting material received at said collection point without terminating pickup and delivery;
diverting material from said path of travel while compaction takes place at said collection point and pickup and delivery continue;
accumulating the diverted material while pickup, delivery, and compaction continue;
discharging the accumulated material while pickup and delivery continue; and
recirculating the discharged material along said path of travel without diverting the same from said path while pickup and delivery continue.

14. A stack-forming method as claimed in claim 13, wherein said discharging step includes returning the accumulation to the field for pickup a second time.

15. A stack-forming method as claimed in claim 13, wherein said picking-up step includes sweeping the material forwardly and upwardly relative to the direction of advancement, said discharging step including directing the accumulation into the forwardly and upwardly sweeping material from in front of the latter.

16. A stack-forming method as claimed in claim 13, wherein said picking-up step includes sweeping the material forwardly and upwardly relative to the direction of advancement, said discharging step including directing the accumulation into the forwardly and upwardly sweeping material from behind the latter.

17. A stack-forming method as claimed in claim 13, wherein said discharging step includes forcibly feeding the accumulation at a predetermined rate of discharge.

* * * * *